United States Patent [19]
Luczak et al.

[11] Patent Number: 4,880,711
[45] Date of Patent: Nov. 14, 1989

[54] TERNARY FUEL CELL CATALYST CONTAINING PLATINUM AND GALLIUM

[75] Inventors: Francis J. Luczak, Glastonbury; Douglas A. Landsman, Hartford, both of Conn.

[73] Assignee: International Fuel Cells Corporation, South Windsor, Conn.

[21] Appl. No.: 259,669

[22] Filed: Oct. 19, 1988

Related U.S. Application Data

[62] Division of Ser. No. 121,009, Nov. 16, 1987, Pat. No. 4,806,515.

[51] Int. Cl.$^4$ ............................................. H01M 4/92
[52] U.S. Cl. ...................................................... 429/40
[58] Field of Search ...................................... 429/13, 40

[56] References Cited

U.S. PATENT DOCUMENTS

| 4,127,468 | 11/1978 | Alfenaar et al. | 429/44 X |
| 4,316,944 | 2/1982 | Landsman et al. | 429/46 X |
| 4,447,506 | 5/1984 | Luczak et al. | 429/44 |
| 4,751,062 | 6/1988 | Kaufman et al. | 429/41 X |

Primary Examiner—Stephen J. Kalafut
Attorney, Agent, or Firm—Charles E. Sohl

[57] ABSTRACT

An improved ternary alloy catalyst for fuel cells containing platinum and gallium. The method of fabricating the catalyst in a high surface area supportive form is also described. The resultant fuel cell catalyst displays a substantial resistance to sintering during operation combined with a resistance to a chemical dissolution during operation. These enhancements permit improved long-term operation of fuel cells.

5 Claims, 1 Drawing Sheet

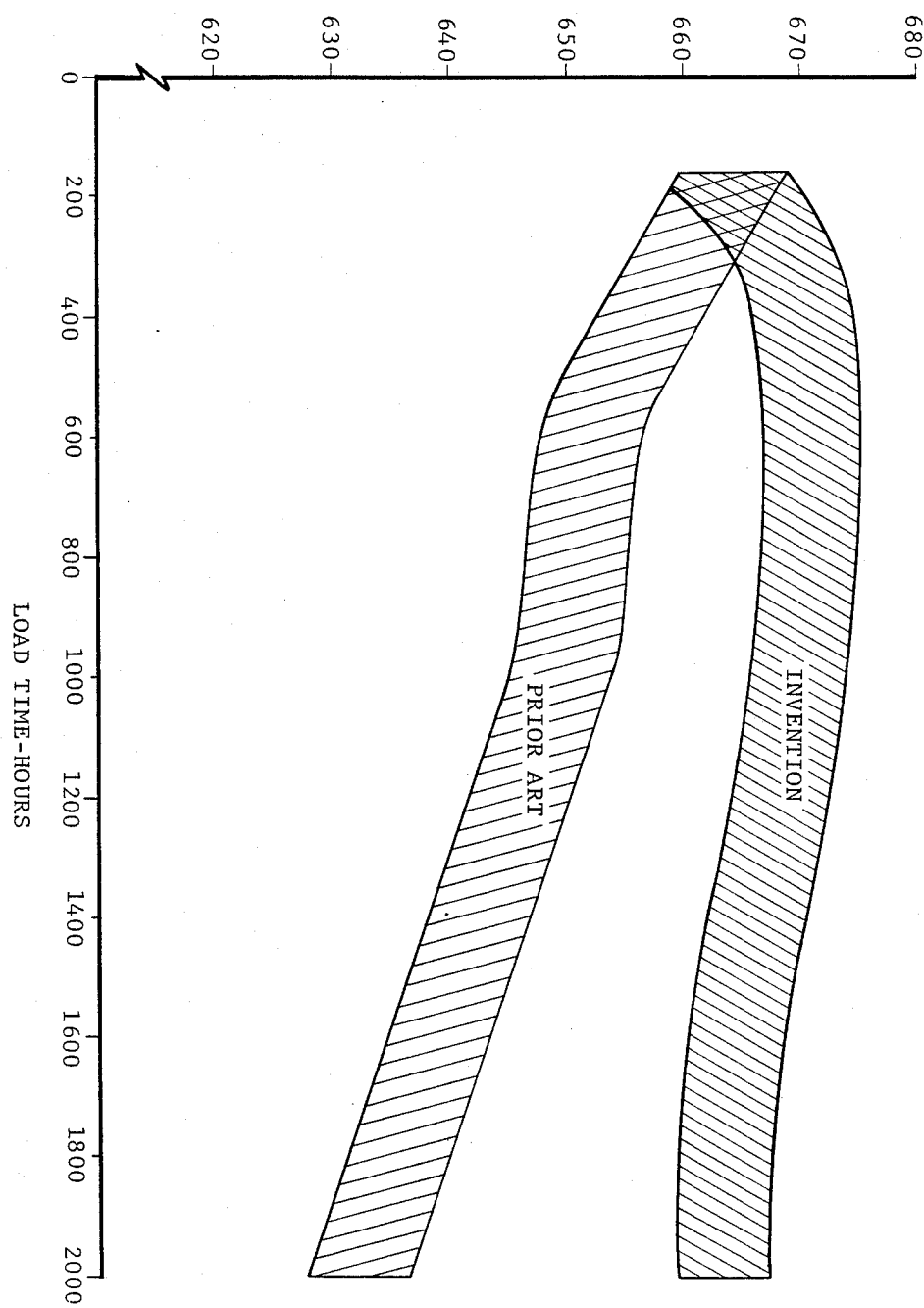

TERNARY FUEL CELL CATALYST CONTAINING PLATINUM AND GALLIUM

This is a division of U.S. Pat. No. 4,806,515 copending application Ser. No. 121,009 filed on Nov. 16, 1987.

TECHNICAL FIELD

The present invention relates to noble metal alloy catalysts, especially to platinum alloy catalysts with gallium additions which are useful in fuel cell electrodes and other catalytic structures.

BACKGROUND ART

A fuel cell is an electrochemical device in which the energy from a chemical reaction is converted directly to electricity. The basic concept was described as far back as 1840 and relies on an anode and cathode separated by an electrolyte. During operation a continuous flow of fuel, commonly hydrogen, is fed to the anode while simultaneously a continuous flow of oxidant, commonly air, is fed to the cathode. The fuel is oxidized at the anode in a catalyzed reaction with the release of electrons. These electrons are conducted to the cathode, through wires external to the cell (to the load), where the oxidant is reduced and the electrons recombined again through the agency of the catalysts. The external flow of electrons from anode to cathode constitutes electrical current which can be made to do useful work.

The type of fuel cell which is in the most advanced state of development and which is near commercial power plant use employs on concentrated phosphoric acid as an electrolyte and operates at about 325° F.–425° F.

The efficiency at which the cell operates is determined by several parameters, including the catalyst activity. The catalyst is necessary since it permits the fuel cell to operate at lower temperature thereby reducing thermal losses which would otherwise reduce efficiency. Over the years there have been many attempts to find inexpensive highly active catalysts. However, the choice of catalytic materials is severely limited since any catalyst which is effective for the purpose must not only have a high activity for the reactions involved, but must also be capable of withstanding the high temperature working environment while being exposed to a strong acid.

Initially catalysts were made of platinum or other noble metals as these materials were catalytically active and were able to withstand the corrosive environment of the cell. While these elements were first used in solid form, later techniques were developed to disperse these metals over the surface of electrically conductive supports (e.g. carbon black) to increase the catalyst surface area which in turn increases the number of reaction sites leading to improved cell efficiency. It was also discovered that certain noble metal alloys, particularly platinum, displayed increased catalytic activity permitting further increases in fuel cell efficiencies. Some of these alloys are platinum-chromium (commonly assigned U.S. Pat. No. 4,316,944) and platinum-vanadium (commonly assigned U.S. Pat. No. 4,202,934). It was also discovered that a ternary catalyst contained platinum, cobalt and chromium was even more effective and this is described in commonly assigned U.S. Pat. No. 4,447,506. These three patents are incorporated by reference. These improved catalysts made possible increased fuel cell efficiency which makes possible the greater utilization of fuel cell technology. However, the search continues for stable catalysts with increased activities for the electrochemical reduction of oxygen.

European Pat. No. 0149293 describes a catalyst containing platinum and gallium. This catalyst is described as being useful in fuel cell applications and is alleged to provide improvements in catalytic activity and in long-term stability.

DISCLOSURE OF INVENTION

The present invention is directed to a noble metal ternary alloy catalyst which has a high mass activity for the electrochemical reduction of oxygen. This catalyst comprises a ternary alloy of platinum, gallium, element selected from the group consisting of chromium, cobalt, nickel and mixtures thereof supported on electrically conductive carbon black. This alloy catalyst is stable over long periods of use.

The foregoing and other features and advantages of the present invention will become more apparent from the following description and accompanying drawing.

BRIEF DESCRIPTION OF DRAWING

The FIGURE shows the performance of an invention catalyst as compared with a prior art catalyst.

BEST MODE FOR CARRYING OUT THE INVENTION

The present invention comprises alloy catalysts useful in fuel cells and other applications. The alloy range of the present invention catalyst comprises from 5–20 atomic % gallium, 50–60 atomic % platinum, balance selected from the group consisting of chromium, cobalt and nickel and mixtures thereof with chromium mixtures of chromium and cobalt being preferred.

The alloy catalyst must contain at least about 50% platinum to be an effective catalytic material. Other elements in the same periodic group namely iridium, rhodium, osmium and ruthenium may be substituted for a portion (up to about 20%) of the platinum, but platinum is preferred as a catalytic material.

Preferably this alloy catalyst is prepared to the form which provides at least 30 square meters of surface area per gram of catalyst. Table 1 provides some data comparing catalyst according to the present invention with some prior art catalyst materials. The information in Table 1 is based on the initial performance observed when the catalyst is fabricated into a gas diffusion electrode and operated at 0.9 volts in oxygen one atmosphere pressure at 375° F. in a 99% phosphoric acid electrolyte. The potential is measured relative to an unpolarized $H_2$/Pt reference electrode at the same pressure and temperature and electrolyte. The information is normalized to what would be obtained for one milligram of catalyst and is expressed as milliamps per milligrams of catalyst.

Referring now to the Table, the catalyst denoted as GSB18 containing 50 atomic % platinum, 20 atomic % chromium, and 30 atomic % cobalt is the catalyst regarded by the inventors as the current state of the art catalyst for this type of fuel cell. The catalyst compositions immediately below the GSB18 composition are compositions according to the present invention. It is not difficult to see why the chromium containing invention variant is preferred over cobalt since alloys containing chromium can produce generally higher $O_2$ activity and a higher voltage output. The invention catalyst initial performance, especially the chromium variant of the invention catalyst is essentially equal to that provided by the state of the art, platinum-chromium-cobalt catalyst.

The performance superiority of the present invention is largely related to the stability of the catalyst. Catalyst stability has two major aspects. The first is resistance to sintering during operation. Since the catalyst is prepared in a high surface area form, there is a tendency for a catalyst system to sinter and thereby reduce its surface area, when operated at elevated temperatures. Table 2 shows the sintering performance (as measured by surface area reduction) of the invention catalyst as compared to the GSB18 standard catalyst for several conditions of temperature and operating conditions, over a 168 hour period. The information in Table 2 shows consistent superiority of the invention catalyst over the state of the art catalyst in resisting sintering. Table 2 suggests that chromium is somewhat more effective than cobalt in increasing resistance to sintering and that for either cobalt or chromium that increasing amounts of these elements increase sintering resistance. As might be expected operation at high temperatures (450° F. versus 400° F.) produces increased sintering. Also, operating at higher voltage output, reflective of lower current draw, has a marked effect on sintering.

The other major factor which reduces fuel cell catalyst effectiveness is chemical dissolution. Table 3 shows relevant test data on dissolution. This is basically is the tendency of the acid electrolyte to dissolve the catalyst. This is measured in terms of platinum loss during a test period. The loss of platinum is significant because platinum is the major contributor to catalytic activity. Again, operation at higher voltage levels substantially increases the platinum loss by dissolution. Also, it can be seen that the invention compositions, the gallium containing compositions, were most resistant to loss of platinum in the tests made. In these tests only the chromium containing invention alloy was tested and the effect of changing the gallium content from 10% to 20% was inconclusive.

The FIGURE shows the performance of an invention catalyst ($Pt_{50}-Cr_{40}-Ga_{10}$) as contrasted with the prior art GSB18 material as a function of millivolts at a current draw of 200 amps per square foot in a cell operated at 400° F. The scatter bands are based on about fifty measurements for each catalyst. It can be seen that the chromium variant of the invention alloy was far superior to the GSB18 standard material. The improvements which are shown in the FIGURE are largely attributable to the improved resistance to sintering and improved chemical stability of the invention alloys.

EXAMPLE 1

The following procedure can be used to prepare a $Pt_{50} Co_{40} Ga_{10}$ catalyst supported on carbon.
1. Disperse 3 grams of commercially available platinum on carbon catalyst (10% Pt by wt) in 45 ml of distilled water and ultrasonically.
2. Dissolve 0.35802 grams of cobaltous nitrate in 10 ml of distilled water.
3. Add the cobaltous nitrate solution to the dispersed catalyst, adjust the pH to 5.5 using ammonium hydroxide and mix.
4. Dissolve 0.07863 grams of gallium nitrate in 10 ml distilled water. Add this solution to the catalyst dispersion with cobaltous nitrate.
5. Set the pH to 5.5 using ammonium hydroxide and mix.
6. Dry the suspension at 190° F for 12 hours then sieve the materials through an 80 mesh screen.
7. Heat treat the solids in flowing nitrogen at 1700° F. for one hour then at 1100° F. for one hour, then cool quickly to room temperature. Remove to ambient atmosphere.

EXAMPLE 2

The following procedure can be used to prepare a $Pt_{50} Cr_{40} Ga_{10}$ catalyst supported on carbon.
1. Disperse 3 grams of commercially available platinum on carbon catalyst (10% Pt by wt) in 45 ml of distilled water and blend ultrasonically.
2. Dissolve 0.49173 grams of chromic nitrate in 10 ml of distilled water.
3. Add the chromic nitrate solution to the catalyst dispersion; adjust the pH to 5.5 using ammonium hydroxide and mix.
4. Dissolve 0.07863 grams of gallium nitrate in 10 ml of distilled water. Add this to the solution in 3 (above); adjust the pH to 5.5 using ammonium hydroxide and mix.
5. Dry the suspension at 190° F. for 12 hours, then sieve the materials through an 80 mesh screen.
6. Heat treat the solids in flowing nitrogen at 1700° F for one hour then at 1100° F. for one hour, then cool quickly to room temperature. Remove to ambient atmosphere.

EXAMPLE 3

The following procedure can be used to prepare a $Pt_{50} Co_{10} Cr_{30} Ga_{10}$ catalyst supported on carbon.
1. Disperse 3 grams of commercially available platinum on carbon catalyst (10% Pt by wt) in 45 ml of distilled water.
2. Dissolve 0.3691 grams of chromic nitrate in 10 ml of distilled water. Add this to the catalyst dispersion and adjust the pH of the solution to 5.5 using ammonium hydroxide and mix.
3. Dissolve 0.09042 grams of cobaltous nitrate in 10 ml of distilled water. Add this to the dispersion in 2 (above), set pH to 5.5 using ammonium hydroxide and mix.
4. Dissolve 0.07863 grams of gallium nitrate in 10 ml of distilled water. Add this to the dispersion in 3 (above), set the pH to 5.5 using ammonium hydroxide and mix.
5. Dry the suspension at 190° F. for 12 hours then sieve the materials through an 80 mesh screen.
6. Heat treat the solids in flowing nitrogen at 1700° F. for one hour then at 1100° F. for one hour. Cool quickly to room temperature. Remove to ambient atmosphere.

Although this invention has been shown and described with respect to detailed embodiments thereof, it will be understood by those skilled in the art that various changes in form and detail thereof may be made without departing from the spirit and scope of the claimed invention.

TABLE 1

Gallium Ternary Catalysts
Initial Performance

| Catalyst # | Catalyst Composition Atomic % | | | Performance O2 Activity mR/mg | Air Voltage @ 200 mA/cm2 mV | Surface Area M2/gm |
|---|---|---|---|---|---|---|
| | Pt | Ga | X | | | |
| GSB-18 | 50 | Ce = 20 | Co = 30 | 35.0 | 732 | 55.0 |
| E121-43C1 | 50 | 10 | Co = 40 | 24.2 | 709 | 56.8 |
| E121-43C2 | 50 | 20 | Co = 30 | 24.7 | 711 | 62.7 |
| E121-43C3 | 55 | 10 | Co = 35 | 22.3 | 705 | 59.2 |
| E121-43C4 | 55 | 20 | Co = 25 | 25.6 | 714 | 63.3 |
| E121-43C5 | 60 | 10 | Co = 30 | 23.2 | 704 | 48.9 |
| E121-43C6 | 60 | 20 | Co = 20 | 21.2 | 703 | 51.6 |
| E121-43C7 | 65 | 10 | Co = 25 | 22.5 | 700 | 47.6 |
| E121-43C8 | 65 | 20 | Co = 15 | 21.8 | 706 | 51.7 |
| E121-47A1 | 50 | 10 | Cr = 40 | 33.6 | 724 | 53.3 |
| E121-47A2 | 50 | 20 | Cr = 30 | 31.0 | 725 | 54.5 |
| E121-47A3 | 55 | 10 | Cr = 35 | 34.2 | 723 | 59.6 |
| E121-47A4 | 55 | 20 | Cr = 25 | 31.7 | 721 | 61.1 |
| E121-47A5 | 60 | 10 | Cr = 30 | 30.3 | 716 | 61.3 |
| E121-47A6 | 60 | 20 | Cr = 20 | 31.7 | 718 | 57.5 |
| E121-47A7 | 65 | 10 | Cr = 25 | 29.3 | 715 | 63.0 |
| E121-47A8 | 65 | 20 | Cr = 15 | 29.2 | 713 | 60.1 |

TABLE II

LABORATORY SINTERING TEST RESULTS

| Test No. | Catalyst | Test Conditions | Area Loss % |
|---|---|---|---|
| 1. | Pt(50)Ga(20)Co(30) | 450 F., 0.75 V, 168 hrs. | 35.4 |
| " | Pt(50)Ga(25)Cr(25) | " | 32.5 |
| " | GSB-18 | " | 43.5 |
| 2. | Pt(50)Co(40)Ga(10) | " | 28.8 |
| " | Pt(50)Co(30)Ga(20) | " | 29.8 |
| " | Pt(55)Co(35)Ga(10) | " | 31.1 |
| " | Pt(55)Co(25)Ga(20) | " | 31.1 |
| " | GSB-18 | " | 31.9 |
| 3. | Pt(50)Cr(40)Ga(10) | 400 F., 0.75 V, 168 hrs. | 23.2 |
| " | Pt(50)Cr(30)Ga(20) | " | 32.0 |
| " | Pt(55)Cr(35)Ga(10) | " | 27.8 |
| " | Pt(55)Cr(25)Ga(20) | " | 31.2 |
| " | GSB-18 | " | 32.9 |
| 4. | Pt(50)Cr(40)Ga(10) | 425 F., 0.85, 168 hrs. | 45.0 |
| " | Pt(50)Cr(30)Ga(20) | " | 48.9 |
| " | GSB-18 | " | 54.5 |
| 5. | Pt(50)Cr(40)Ga(10) | 425 F., 0.90, 168 hrs. | 95.5 |
| " | Pt(50)Cr(30)Ga(20) | " | 96.1 |
| " | GSB-18 | " | 98.0 |

TABLE III

LABORATORY ALLOY DISSOLUTION RESULTS

TEST No. 1, Conditions: 425° F. at 0.85 V for 168 hours.

| Catalyst Description | Platinum Content Initial MG/CM2 | Final MG/CM2 | % Loss |
|---|---|---|---|
| Pt(50)Cr(40)Ga(10) | 0.49 | 0.34 | 33.3 |
| Pt(50)Cr(30)Ga(20) | 0.51 | 0.34 | 30.6 |
| GSB-18 | 0.49 | 0.30 | 38.8 |

| | Composition | | |
|---|---|---|---|
| | Platinum | Chromium | Element |

TABLE III-continued

LABORATORY ALLOY DISSOLUTION RESULTS

| Catalyst Description | Atomic % Before/After | Atomic % Before/After | Atomic % Before/After |
|---|---|---|---|
| Pt(50)Cr(40)Ga(10) | 58.4/80.0 | 40.4/19.4 | 1.2/0.7 |
| Pt(50)Cr(30)Ga(20) | 52.1/74.8 | 45.3/21.5 | 2.7/0.7 |
| GSB-18 | 60.3/87.0 | 22.7/4.4 | 16.4/8.6(Co) |

Test No. 2 Conditions: 425° F. at 0.9 V for 168 hours.

| Catalyst Description | Platinum Content Initial MG/CM2 | Final MG/CM2 | % Loss |
|---|---|---|---|
| Pt(50)Cr(40)Ga(10) | 0.49 | 0.07 | 85.7 |
| Pt(50)Cr(30)Ga(20) | 0.51 | 0.06 | 88.2 |
| GSB-18 | 0.49 | 0.03 | 93.8 |

We claim:

1. Method of enhancing the electrochemical conversions of fuel and oxygen to water and electricity in a fuel cell, which includes at least one cathode and at least one anode which comprises:
   contacting the reactants with a catalyst, at said at least one cathode, consisting essentially of at least 50 atomic % platinum, gallium and at least one material selected from the group consisting of chromium, cobalt, nickel and mixtures thereof.

2. A method as in claim 1 wherein the catalyst contains from 5 to 20 atomic percent gallium.

3. A method as in claim 1 wherein the catalyst contains chromium.

4. A method as in claim 1 wherein the catalyst contains cobalt and chromium.

5. A method as in claim 1 wherein the catalyst is supported in a carbonaceous material and displays at least 30 meters$^2$ surface area per gram of catalyst.

* * * * *